May 6, 1952     J. C. BUTTRICK     2,595,565
CUTTING UNIT FOR MINING MACHINES
Filed March 14, 1950
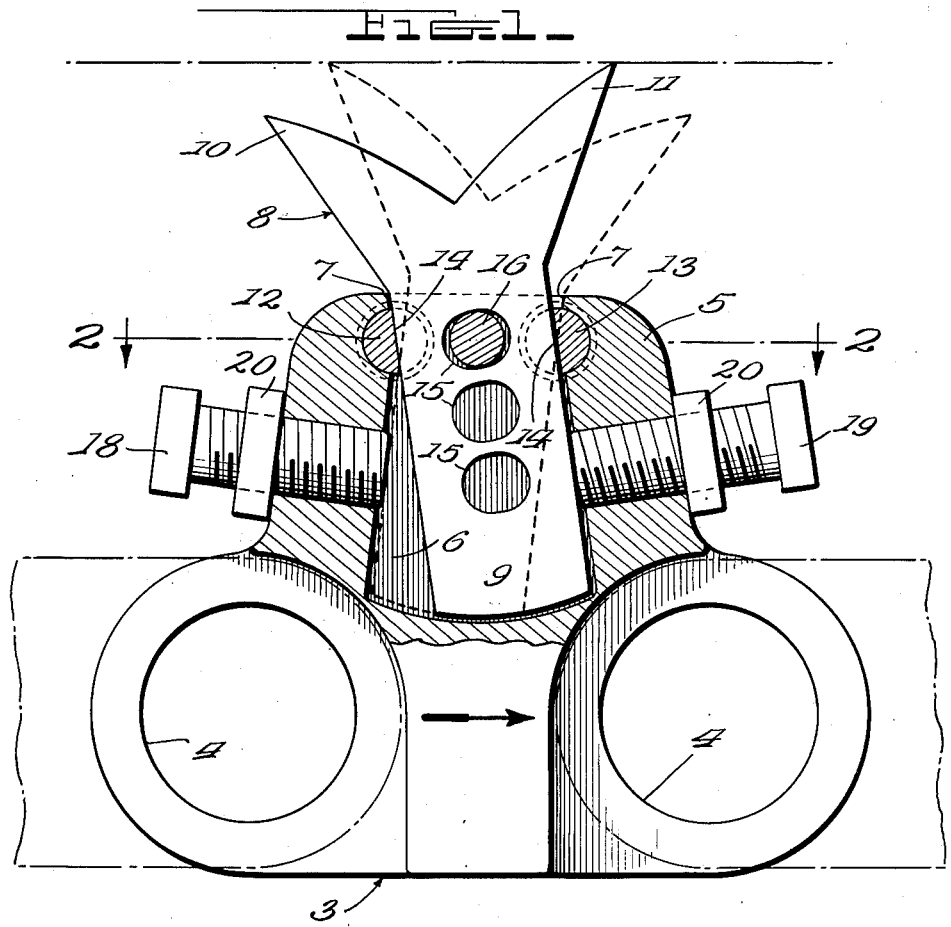
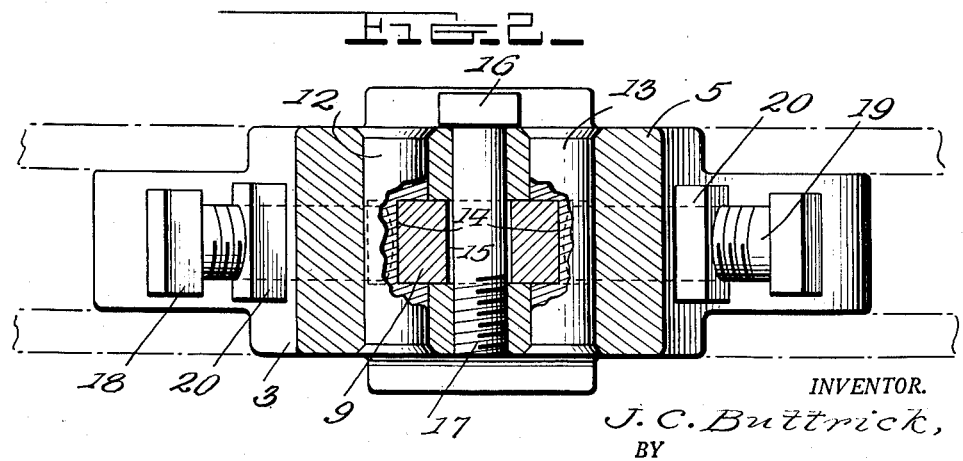
INVENTOR.
J. C. Buttrick,
BY
Baldwin, Wight & Brevost,
attys.

Patented May 6, 1952

2,595,565

UNITED STATES PATENT OFFICE 2,595,565

CUTTING UNIT FOR MINING MACHINES

James C. Buttrick, Scarbro, W. Va.

Application March 14, 1950, Serial No. 149,596

7 Claims. (Cl. 262—33)

My invention consists in new and useful improvements in mining apparatus and is particularly directed to a cutting unit which forms one of a series of links in an endless cutting chain of the type employed in coal mining operations or the like.

The primary object of the present invention is to provide an improved cutting unit comprising a double acting cutting bit, reversibly mounted in respective links of the cutter chain and adapted to automatically shift its cutting head so as to operate in either direction of chain travel. Another object of the invention is to provide a novel and effective means for mounting the reversible bit in the chain link so as to permit a controlled rocking movement of the bit from one cutting position to a reverse cutting position, by simply reversing the direction of travel of the chain and without the necessity of removing and manually shifting the bit.

A further object of the invention is to provide a reversible cutting bit which is shiftable between two opposed fulcrums carried in the chain link and so designed as to serve as closures for the upper end or mouth of the bit receiving cavity in the link, whereby dust and cuttings are prevented from entering the bit cavity to interfere with the operation of the device.

With the above and other objects in view which will appear as the description proceeds, my invention consists in the novel features herein set forth, illustrated in the accompanying drawing and more particularly pointed out in the appended claims.

Referring to the drawing in which numerals of like character designate similar parts in both views:

Figure 1 is a plan view of one of my improved cutter units with the bit supporting extension shown in section; and Figure 2 is a sectional view taken on line 2—2 of Figure 1.

In the drawing 3 represents one of a series of links forming an endless coal cutting chain which may be of the type used in conventional coal cutting machinery, opposite ends of the link being secured to corresponding ends of adjacent links or connecting straps, by means of the usual rivets or bolts 4. On the side opposite the sprocket engaging face of the link, I provide an integral, lateral extension or head 5, having a central fan-shaped cavity 6 lying in a plane parallel to that of the link travel, its outer end forming a slightly flaring mouth 7 for receiving the cutting bit 8.

My improved bit 8 consists of an elongated, straight edged shank 9 which terminates at its outer end in a pair of oppositely directed cutting teeth 10 and 11 which are preferably tipped with tungsten carbide to enhance their cutting properties. The shank 9 of the bit fits within the cavity 6 of head 5 and is of a width to permit a pivotal movement of the shank in the plane of the cavity. Adjacent the outer end of the cavity 6 and just within the outer boundaries of the mouth 7, I provide a pair of opposed fulcrum bolts 12 and 13 which extend entirely through the head 5 and across the edges of the cavity 6, on either side of the bit 8. As will be seen in the drawing, the central portions of respective fulcrum bolts are provided with opposed peripheral recesses 14, to receive the adjacent edges of the shank 9 of the bit 8, and as the fulcrum bolts are rotatably mounted in the head 5, this arrangement permits a rocking movement of the bit in the plane of travel of the link in either direction, with a shifting of the fulcrum support from one to the other of the bolts 12 and 13.

The shank 9 is preferably provided with a series of longitudinally spaced central pin receiving apertures 15 which extend through the shank and are preferably oval in shape to accommodate the rocking movement of the bit. A transverse pin 16 extends through the head 5 and is screw threaded at its inner end 17, to engage complementary threads in the head. Thus, the shank 9 may be longitudinally adjusted with respect to the head, by simply varying the particular aperture 15 to be engaged by the pin 16, which permits the necessary rocking movement of the bit but prevents longitudinal displacement thereof.

On opposite sides of the cavity 6, the head 5 is drilled to receive cap screws 18 and 19 respectively, the inner ends of which extend into the cavity and are adapted to limit the extent of rocking movement in either direction. Preferably these cap screws are equipped with lock nuts 20 for maintaining the desired adjustment.

As previously stated, my improved cutting unit is attached to and forms a part of each of a series of links, together forming an endless cutter chain which travels in a horizontal path over sprocket wheels mounted on suitable vertical axes supported by the mining machine. In operation, assuming that the chain of which link 3 forms a part, is travelling to the right or in the direction of the arrow in Figure 1, the cutter teeth 11 become the effective teeth and rock the bit 8 on its rear fulcrum 12 until the forward edge of the shank 9 abuts the end of cap screw 19. Each of the bits in the various links of the chain maintains this rearwardly tilted position as the machine progressively cuts coal from the rib in which it is operated, the machine constantly advancing until that cutting operation is completed. Now, if it is desired to cut from the left rib of the mine, all that is necessary is to reverse the direction of travel of the chain which automatically tilts the respective bits 8 in the opposite direction on the fulcrums 13, bringing the cutting teeth 10 into effective position as shown in dotted lines in Figure 1.

It will be apparent that the opposed fulcrums 12 and 13 provide a rugged support for the shank 9 of the bit and together with the cross pin 16, retain the bit in the proper cutting position. During the swinging or rocking movement of the bit there is sufficient clearance between the shank 9 and the two opposed recesses 14, to permit a slight sliding movement between the bit and the fulcrum bolts which is necessary when the effective fulcrum shifts from one fulcrum bolt to the other. Thus, it will be seen in Figure 1 that the upper end of the shank 9 is slightly more extended beyond the fulcrum bolt 13 than is the opposite edge with respect to the fulcrum bolt 12. Likewise, in the reverse position shown in the dotted lines in Figure 1, the left hand edge of the shank slides outwardly with respect to the fulcrum bolt 12.

As the recessed portions 14 of the fulcrum bolts remain constantly in engagement with the respective edges of the shank 9, the bolts 12 and 13 are caused to rotate as the bit rocks. Thus, as will be seen from Figure 1, the fulcrum bolt 13, opposite the effective fulcrum 12, has rotated with the rocking of the bit and its periphery has closed the gap between the edge of the mouth 7 and the adjacent edge of the shank 9, so as to prevent the entrance of dust or cuttings which would otherwise interfere with the proper operation of the bit. When the chain moves in the opposite direction, the reverse takes place and the fulcrum bolt 12 rotates to close the gap in mouth 7.

As wear takes place on the cutting teeth of the bit or for purposes of adjusting the cutting position of the bit, the cap screws 18 and 19 are adjusted to limit the rocking movement in either direction of the bit. Furthermore when it is desired to extend the bit 8 outwardly beyond that position shown in Figure 1, the pin 16 is removed and the bit shank is slid longitudinally outwardly so as to bring the selected opening 15 in line for engagement when the pin 16 is reinserted.

It will be apparent from the foregoing that a cutting chain equipped with units formed in accordance with my invention will materially facilitate the cutting operation and permit a continuous stream of coal to be cut and conveyed from the kerf without interruption, regardless of the direction of travel of the cutting chain. The operation is completely automatic in that no manual adjustments are required in order to reverse the effective cutting positions of the bits.

From the foregoing it is believed that my invention may be readily understood by those skilled in the art without further description, it being borne in mind that numerous changes may be made in the details of structure without departing from the spirit of the invention as set forth in the following claims.

I claim:

1. A cutting unit for a mining machine cutting chain, comprising a lateral extension formed on a link of said chain, a cavity in said extension, a bit supported in said cavity with its cutting end projecting laterally therefrom, a pair of opposed fulcrum bolts in said extension, pivotally engaging respective edges of said bit, at a point within said cavity and adjustable means for limiting the pivotal movement of said bit.

2. A cutting unit for a mining machine cutting chain, comprising a lateral extension formed on a link of said chain, a cavity in said extension, a pair of transverse fulcrum bolts supported in said extension on either side and within the confines of said cavity, a double acting bit having a shank disposed in said cavity with portions of its opposite edges in engagement with respective fulcrum bolts and its cutting end projecting from said cavity, the dimension of said cavity, in the plane of said shank, being sufficient to permit a rocking movement of said bit in either direction, in the plane of travel of said link, about respective fulcrums.

3. A cutting unit for a mining machine cutting chain, comprising a lateral extension formed on a link of said chain, a cavity in said extension, a pair of transverse fulcrum bolts supported in said extension on either side and within the confines of said cavity, a double acting bit having a shank disposed in said cavity with portions of its opposite edges in engagement with respective fulcrum bolts and its cutting end projecting from said cavity, the dimension of said cavity, in the plane of said shank, being sufficient to permit a rocking movement of said bit in either direction, in the plane of travel of said link, about respective fulcrums, and adjustable means for limiting the rocking movement in either direction.

4. A device as claimed in claim 3 wherein said fulcrum bolts are provided with opposed peripheral recesses adapted to slidably embrace the respective edges of said shank, said bolts being rotatable in said extension, upon the rocking movement of said bit.

5. A cutting unit for a mining machine cutting chain, comprising a link forming a part of the chain, a lateral extension formed on the link, a substantially fan-shaped cavity in said extension lying in the plane of travel of the link and terminating in an outwardly directed restricted mouth, a bit having a shank disposed in said cavity with its cutting end projecting from said mouth, a pair of transverse fulcrum bolts rotatably supported in said extension on either side and within the confines of said cavity adjacent said mouth, the said fulcrum bolts being provided with opposed peripheral recesses adapted to slidably embrace the respective edges of said shank, whereby said bit is shiftable from one fulcrum to the other while maintaining engagement with both, and means for limiting the rocking movement of said bit.

6. A cutting unit for a mining machine cutting chain, comprising a lateral extension formed on a link of said chain, a substantially fan-shaped cavity in said extension, lying in a plane parallel to that of the path of movement of said link and terminating at its outer extremity in a restricted mouth, a bit having a shank rockably disposed in said cavity with its cutting end projecting from said mouth, a pair of transverse fulcrum bolts rotatably mounted in said extension, adjacent said mouth, and with portions of their respective peripheries lying within said cavity, opposed peripheral recesses in respective bolts, adapted to embrace the adjacent edges of said shank, whereby the shank and bolts collectively close said mouth, the effective fulcrum of said shank being shiftable from one bolt to the other, upon reversing the direction of travel of said link and the bolts being simultaneously rotatable with the shifting of the shank.

7. A device as claimed in claim 6 including a pair of opposed abutments screw threaded in said extension with their inner ends adapted to enter the cavity to adjustably restrict the extent of rocking movement of said shank.

JAMES C. BUTTRICK.

REFERENCES CITED

The following references are of record in the file of this patent:

UNITED STATES PATENTS

| Number | Name | Date |
|---|---|---|
| 640,621 | Bailey | Jan. 2, 1900 |
| 2,085,756 | Joy | July 6, 1937 |